(12) United States Patent
Plangetis

(10) Patent No.: US 9,057,415 B1
(45) Date of Patent: Jun. 16, 2015

(54) ADAPTABLE MULTI-ELEMENT VIBRATION ISOLATOR

(75) Inventor: Gus F. Plangetis, Annapolis, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 974 days.

(21) Appl. No.: 13/162,983

(22) Filed: Jun. 17, 2011

(51) Int. Cl.
- F16F 7/00 (2006.01)
- F16F 1/40 (2006.01)
- F16F 3/08 (2006.01)

(52) U.S. Cl.
CPC . *F16F 1/40* (2013.01); *F16F 1/406* (2013.01); *F16F 3/08* (2013.01)

(58) Field of Classification Search
USPC .......... 267/140.5, 141, 141.1, 141.2
See application file for complete search history.

(56) References Cited

U.S. PATENT DOCUMENTS

| | | | |
|---|---|---|---|
| 4,725,046 A | 2/1988 | Sugino | |
| 5,118,086 A | 6/1992 | Stevenson et al. | |
| 5,429,338 A * | 7/1995 | Runge et al. | 248/583 |
| 5,573,344 A | 11/1996 | Crane et al. | |
| 5,816,712 A | 10/1998 | Brown et al. | |
| 5,887,858 A | 3/1999 | Su | |
| 5,899,443 A | 5/1999 | Su | |
| 6,209,841 B1 | 4/2001 | Houghton, Jr. et al. | |
| 6,298,963 B1 | 10/2001 | Kim | |
| 6,394,407 B1 | 5/2002 | Ryaboy | |
| 6,746,005 B1 | 6/2004 | Su et al. | |
| 7,278,623 B2 | 10/2007 | Yasuda et al. | |
| 7,586,236 B2 | 9/2009 | Corsaro et al. | |
| 7,589,447 B2 | 9/2009 | Stout et al. | |
| 2008/0023898 A1 * | 1/2008 | Palinkas | 267/141 |
| 2008/0191118 A1 | 8/2008 | Johnson et al. | |

* cited by examiner

*Primary Examiner* — Robert A Siconolfi
*Assistant Examiner* — Vu Q Nguyen
(74) *Attorney, Agent, or Firm* — Howard Kaiser

(57) ABSTRACT

The present invention's vibration/shock amelioration device, as typically embodied, has a geometric device axis and includes two axial endplates, an intermediate support structure, and at least six truncated-conical resilient (e.g., elastomeric) elements. The intermediate support structure is equidistant between the endplates and lies in a geometric bisector plane that is perpendicular to the device axis. Each resilient element has a geometric conical axis, a larger-diameter axial end, and a smaller-diameter axial end. The resilient elements are fixed between the support structure and an endplate and are arranged symmetrically with respect to the device axis whereby the conical axes intersect the device axis at oblique angles and the smaller-diameter axial ends are closer to the bisector plane than are the larger-diameter axial ends. The intermediate support structure can include a single rigid piece, or a composite unit having a pair of rigid members and a resilient (e.g., elastomeric) member sandwiched therebetween.

20 Claims, 11 Drawing Sheets

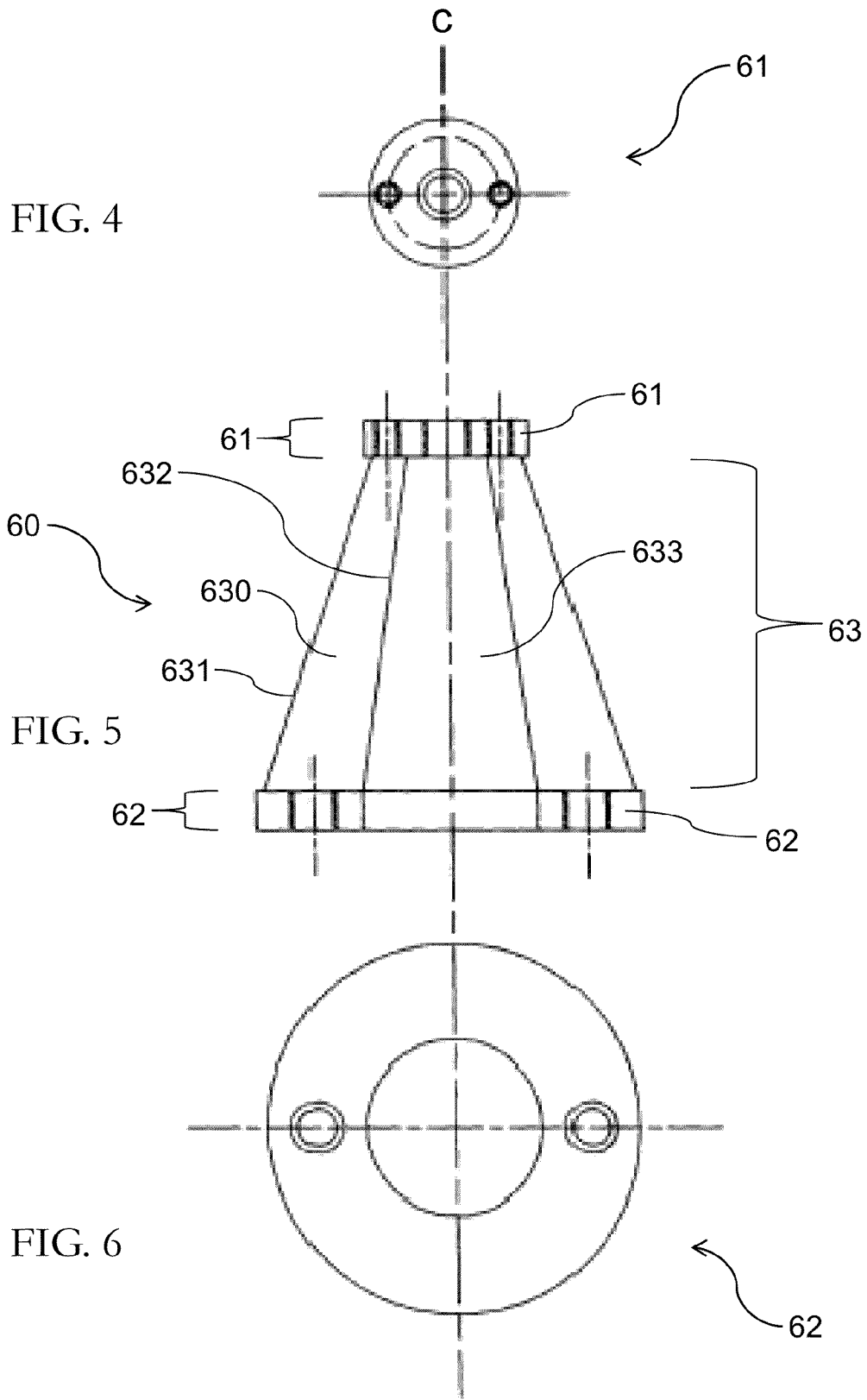

40, 50

40, 50

40, 50

40, 50

ADAPTABLE MULTI-ELEMENT VIBRATION ISOLATOR

BACKGROUND OF THE INVENTION

The present invention relates to isolation of vibration and/or shock, more particularly to passive isolation implementing resilient (e.g., elastomeric) material.

In military and commercial contexts, various methods and devices have been known for effecting passive vibration isolation and/or passive shock isolation. Such methods and devices are commonly practiced in association with low natural frequency hardware (e.g., machinery) in order to isolate vibrations at relatively low natural frequencies. Vibration isolation mounts have been developed that seek to address low frequency requirements for vibration and/or shock. However, generally speaking, conventional isolation mounts have not been entirely satisfactory, in terms of their natural frequency response, for purposes of either controlling unwanted vibrations or reducing acoustic energy propagation.

Among the practical considerations for vibration/shock mounts is the desirability of reducing cost and increasing efficiency of fabricating the mount. Many conventional approaches to vibration/shock isolation implement a main elastomeric body. Fabrication of the conventional mount usually involves either (i) a single-part, single-step molding process of the elastomer and the metal structure, or (ii) a two-part, two-step molding process of the elastomer and the metal structure. One-part molding fabrication tends to be performed more often for making smaller mounts, whereas two-part molding fabrication tends to be performed more often for making larger mounts, or for pipe hanger/pipe mount applications.

Another practical consideration for vibration/shock mounts is the desirability of reducing the "footprint" (synonymously referred to herein as the "envelope") of the mount. A "snubber" (synonymously referred to herein as a "restraint" or "restrainer") is an isolator component that limits displacement of the isolator, for instance in the vertical or horizontal direction. Some conventional mounts utilize a snubber that is situated inside the envelope/footprint of the mount; nevertheless, many other conventional mounts utilize a snubber that is situated outside the envelope/footprint of the mount, thereby effectively enlarging the envelope/footprint of the mount.

SUMMARY OF THE INVENTION

In view of the foregoing, it is an object of the present invention to provide an improved mount for vibration isolation and/or shock isolation.

The present invention's isolation mount, as typically embodied, is characterized by a geometric mount axis and, perpendicular thereto, a geometric medial plane. The inventive isolator mount includes plural resilient frustoconical elements and a housing for the resilient frustoconical elements. The housing includes two mount-axially extreme sections and a mount-axially medial section lying in the geometric medial plane. Each resilient frustoconical element has a smaller axial conical end and a larger axial conical end, is characterized by a geometric elemental axis, and is held between the axially medial section and one of the axially extreme sections so that its geometric elemental axis intersects the geometric mount axis and is obliquely angled with respect to, with its smaller axial conical end facing toward, both the geometric mount axis and the geometric medial plane.

Each resilient frustoconical element is placed so that its smaller axial conical end is closer than its larger axial conical end to the geometric mount axis and to the geometric medial plane. Each smaller axial conical end is connected to the mount-axially medial section. Each larger axial conical end is connected to one of the axially extreme sections. The mount-axially extreme sections are an upper mount-axially extreme section and a lower mount-axially extreme section. The resilient frustoconical elements are at least three upper resilient frustoconical elements and at least three lower resilient frustoconical elements. The upper resilient elements are held between the upper axially extreme section and the mount-axially medial section. The lower resilient elements are held between the lower axially extreme section and the mount-axially medial section.

The upper resilient elements generally describe an upper geometric extreme plane. The lower resilient elements generally describe a lower geometric extreme plane. The geometric medial plane, the upper geometric extreme plane, and the lower geometric extreme plane are parallel to each other. The geometric cone axes corresponding to the upper resilient elements are equiangularly spaced apart from each other with respect to the geometric mount axis. The geometric cone axes corresponding to the lower resilient elements are equiangularly spaced apart from each other with respect to the geometric mount axis. The number of upper resilient elements equals the number of lower resilient elements. The upper resilient elements and the lower resilient elements are vertically aligned with each other.

According to typical inventive practice, the mount-axially medial section is bisected by the geometric medial plane. According to some inventive embodiments, all of the resilient elements are approximately identical. According to some inventive embodiments, all of the upper resilient elements are approximately identical, all of the lower resilient elements are approximately identical, and the upper resilient elements and the lower resilient elements differ from each other. According to some inventive embodiments, the mount-axially medial section is an entirely rigid structure. According to some inventive embodiments, the mount-axially medial section is a partly rigid, partly elastomeric structure having an elastomeric member intermediate two rigid members.

Inventive isolation practice has many applications in both the military and the commercial realms. Because the present invention tends to be characterized by lower natural frequency than conventional mounts, inventive practice has greater potential for low-natural-frequency applications. Depending on the embodiment, an inventive mount can be use as a vibration isolator, a shock isolator, or both a vibration isolator and a shock isolator. As frequently practiced, the present invention provides passive vibration isolation, and/or passive shock isolation, for low-natural-frequency hardware/machinery installations.

The present invention typically features housing supports that serve to channel the vibratory energy and/or impact/shock energy from the equipment (e.g., machinery bedplate) above, and/or from the foundation below, to the mount's elastomeric elements. The present invention's channeling of the vibratory energy is encouraged by the focal attributes of the rigid-end-plated elastomeric frustoconical elements and their oblique orientations.

Typical inventive embodiments have replaceable elastomeric elements that can be varied, depending on the application requirements. Because of the present invention's flexibility in fabricating and implementing parts and components, quality and performance can be optimized. For instance, damping can be selectively varied, as required.

Typical inventive practice provides snubber (restraint) capability within the envelope/footprint of the inventive assembly, the inventive mount thereby taking up less space; nevertheless, the present invention has the versatility to be practiced so that snubber capability is situated outside the envelope/footprint of the inventive assembly. A typical inventive configuration allows for ease of inspection of the elastomeric components. Inventive practice can be attributed with recyclability; for instance, the metallic housings can be reused when the elastomer needs replacement or exceeds its useful life.

Molding of the present invention's elastomeric bodies is typically facilitated by shaped metallic bodies that also represent fastening points for assembly of the inventive mount. The metallic components on the elastomer can be used as adapters as part of an injection molding process; in particular, the elastomer can be poured more effectively through use of the metallic components whereby the metallic components and the elastomeric component therebetween become molded as one. The present invention's multiple conical elements are relatively small, and hence their fabrication is easier than fabrication for larger mount applications. Better control during manufacture of smaller molds, as compared with control during manufacture of larger (e.g., single-made) molds such as for larger weight-capacity mounts, implies a more consistent product and superior performance characteristics.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate same or similar parts or components, and wherein:

FIG. 4 is a plan view of the smaller-diameter axial-endplate of an embodiment of an inventive rigid-end-plated frustoconical elastomeric element such as shown in FIG. 5.

FIG. 5 is a cross-sectional elevation view of an embodiment of an inventive rigid-end-plated frustoconical elastomeric element.

FIG. 6 is a plan view of the larger-diameter axial-end-plate of an embodiment of an inventive rigid-end-plated frustoconical elastomeric element such as shown in FIG. 5.

DESCRIPTION OF EXEMPLARY
EMBODIMENTS OF THE INVENTION

Figure 1:
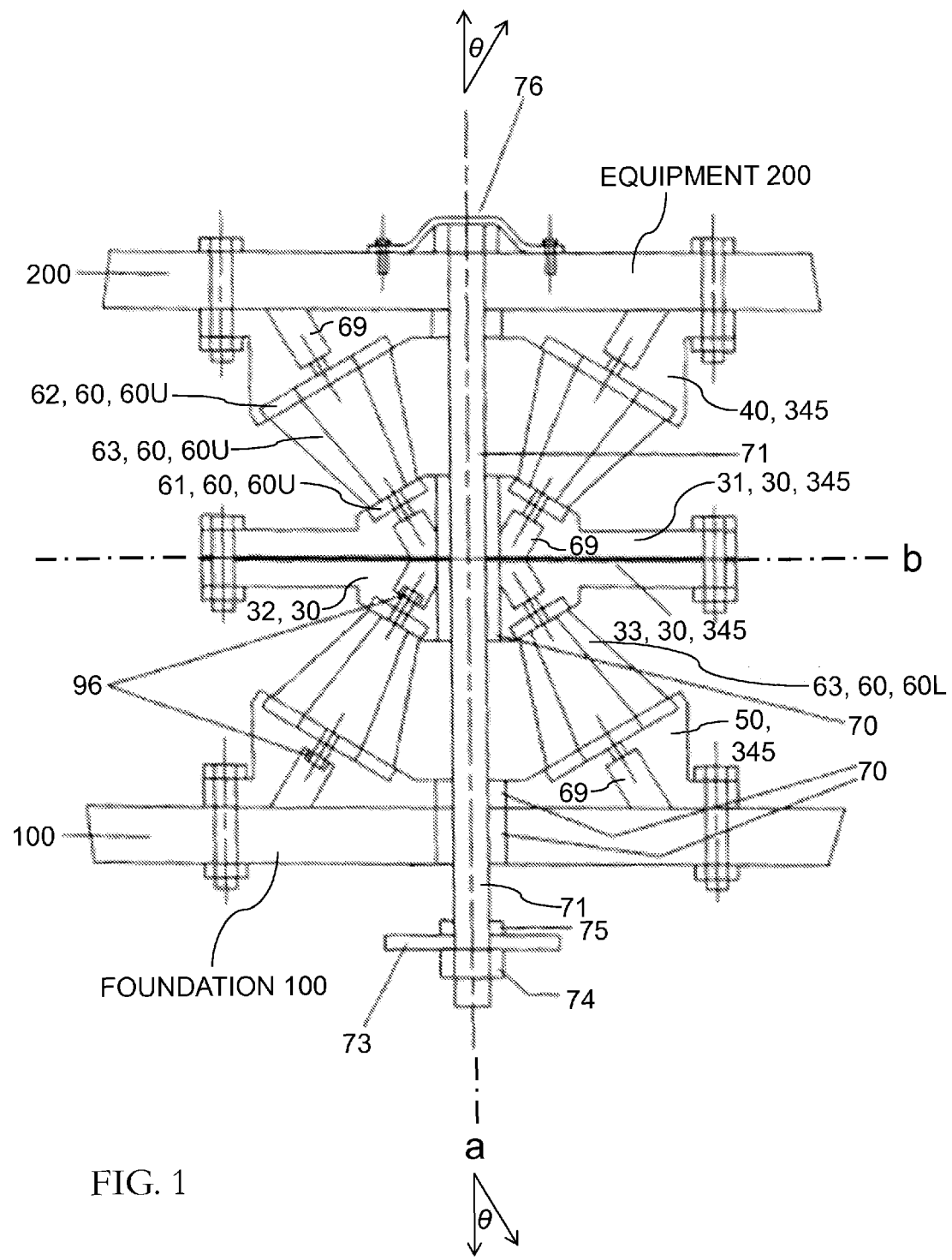
FIG. 1 is a cross-sectional elevation view of an embodiment of an inventive mount having a dichotomous axial midsection construction.
Figure 2:
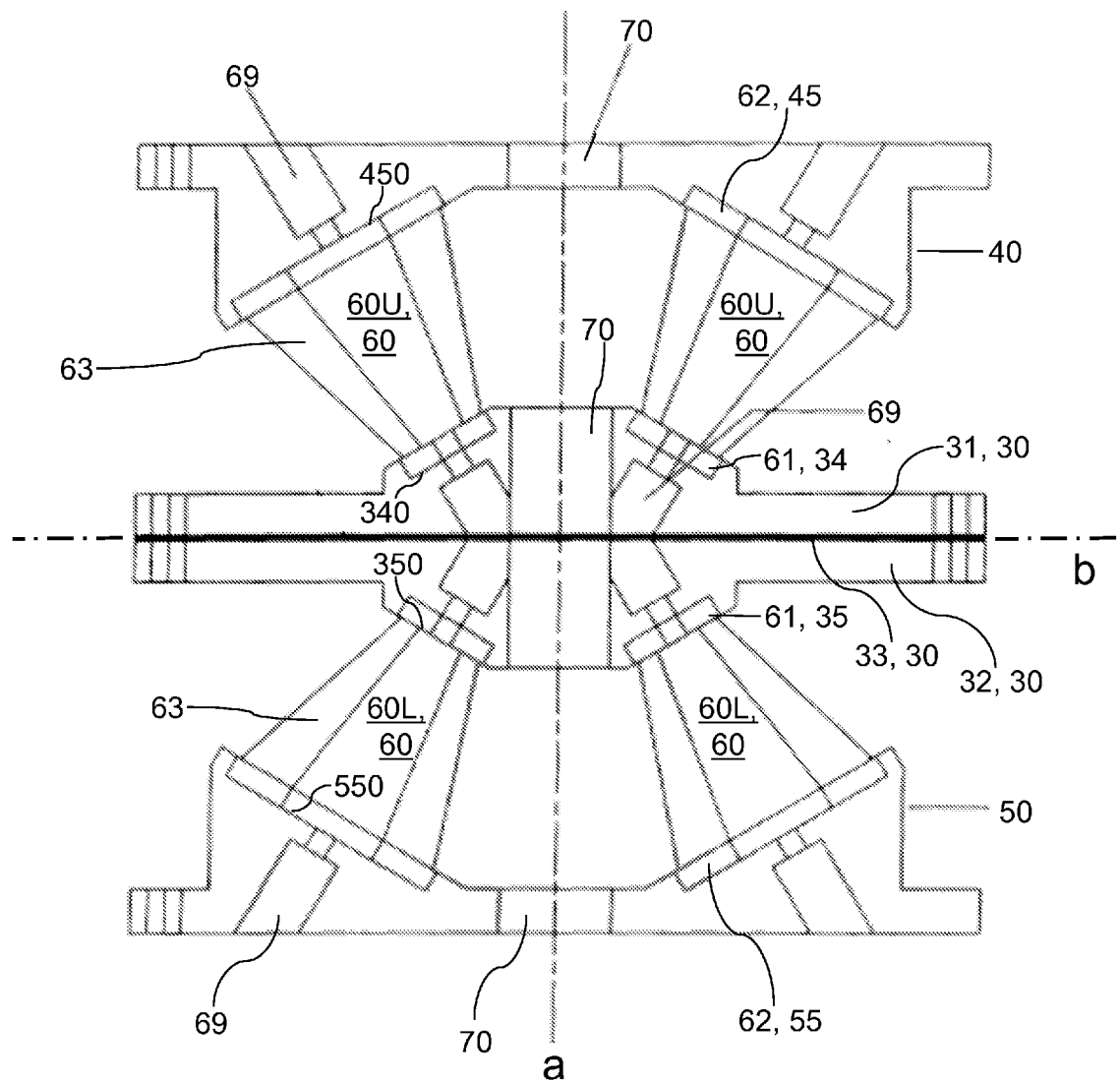
FIG. 2 is a simplified version of the view shown in FIG. 1.

Referring to the figures and particularly to FIG. 1 and FIG. 2, the present invention's vibration/shock isolation mount is characterized by a vertical geometric axis of symmetry a, and by a horizontal geometric bisector plane b. Geometric axis a is perpendicular to geometric plane b. The inventive mount depicted in FIGS. 1 and 2 includes eight resilient elements 60 and a housing 345 for the resilient elements 60. The eight elements 60 that are shown are identical, or practically so. The housing 345 has three main rigid (e.g., metal/metallic) sections, delimited according to situation along axis a, viz., a middle section 30, an upper end section 40, and a lower end section 50.

Four of the resilient elements 60 are "upper" resilient elements 60U; four of the resilient elements 60 are "lower" resilient elements 60L. Upper resilient elements 60U are vertically collocated (at least approximately so) with respect to lower resilient elements 60L. Housing 345 holds upper resilient elements 60 in place between upper end section 40 and middle section 30, and holds lower resilient elements 60 in place between lower end section 50 and middle section 30. Every resilient element 60 includes a minor (smaller-diameter) circular endplate 61, a major (larger-diameter) circular endplate 62, and (between and attached to endplates 61 and 62) a resilient frustoconical body 63. Each resilient element 60 is characterized by a geometric conical axis c such as represented in FIGS. 4-6.

All of the resilient elements 60 have their respective axes c disposed at the same absolute value of an oblique angle θ with respect to axis a. However, the oblique angles θ of axes c of upper resilient elements 60U are opposite the oblique angles θ of axes c of lower resilient elements 60L. Otherwise expressed, it can be considered that the upper axes c are disposed at a positive angle θ, whereas the lower axes c are disposed at a negative angle θ, or vice versa. Every resilient element 60 is positioned so that its smaller axial end (i.e., where its minor endplate 62 is located) points toward axis a and plane b.

The inventive mount shown in FIGS. 1 and 2 has two main rigid (e.g., metal) subassemblies that are identical and inverted with respect to each other, and that house the individual resilient elements 60. The upper subassembly includes a metal upper end section 40 and a metal upper middle subsection 31. The lower subassembly includes a metal lower end section 50 and a metal lower middle subsection 32. These metallic housings serve to hold the resilient elements 60 within the inventive mount, and to secure the inventive mount to the foundation 100 below and the equipment 200 (e.g., via a machine bedplate) above. Depending on the inventive embodiment, resilient elements 60 provide vibration attenuation, or shock attenuation, or both vibration attenuation and shock attenuation.

Axial end sections 40 and 50 are congruous and in an inverted relationship with respect to each other. Middle section 30 is axially intermediate end sections 40 and 50, and is divided into three main parts, viz., upper middle subsection 31, lower middle subsection 32, and damping layer 33. Middle subsections 31 and 32 are congruous and in an inverted relationship with respect to each other. Damping layer 33 is situated in medial geometric plane b, which along axis a divides the inventive mount into two congruous halves that are in an inverted relationship with respect to each other.

Damping layer 33, for instance a damping sheet or film made of an elastomeric material, is sandwiched between middle subsections 31 and 32 and may serve to enhance operational capability. The ordinarily skilled artisan who reads the instant disclosure understands that various characteristics of the damping layer 33, such as thickness and type of elastomeric material, may be selected in consideration of various characteristics of the application, such as load, frequency characteristics, operating environment, and useful life expectancy. The elastomer can be, for instance, a polymer or a natural rubber, and different elastomers may have different damping or energy-dissipative characteristics. The ordinarily skilled artisan will also understand, in the light of the instant disclosure, that various rigid materials, usually metal (pure metal or metal alloy) but possibly composite, may be suitable for inventive practice.

Figure 3:
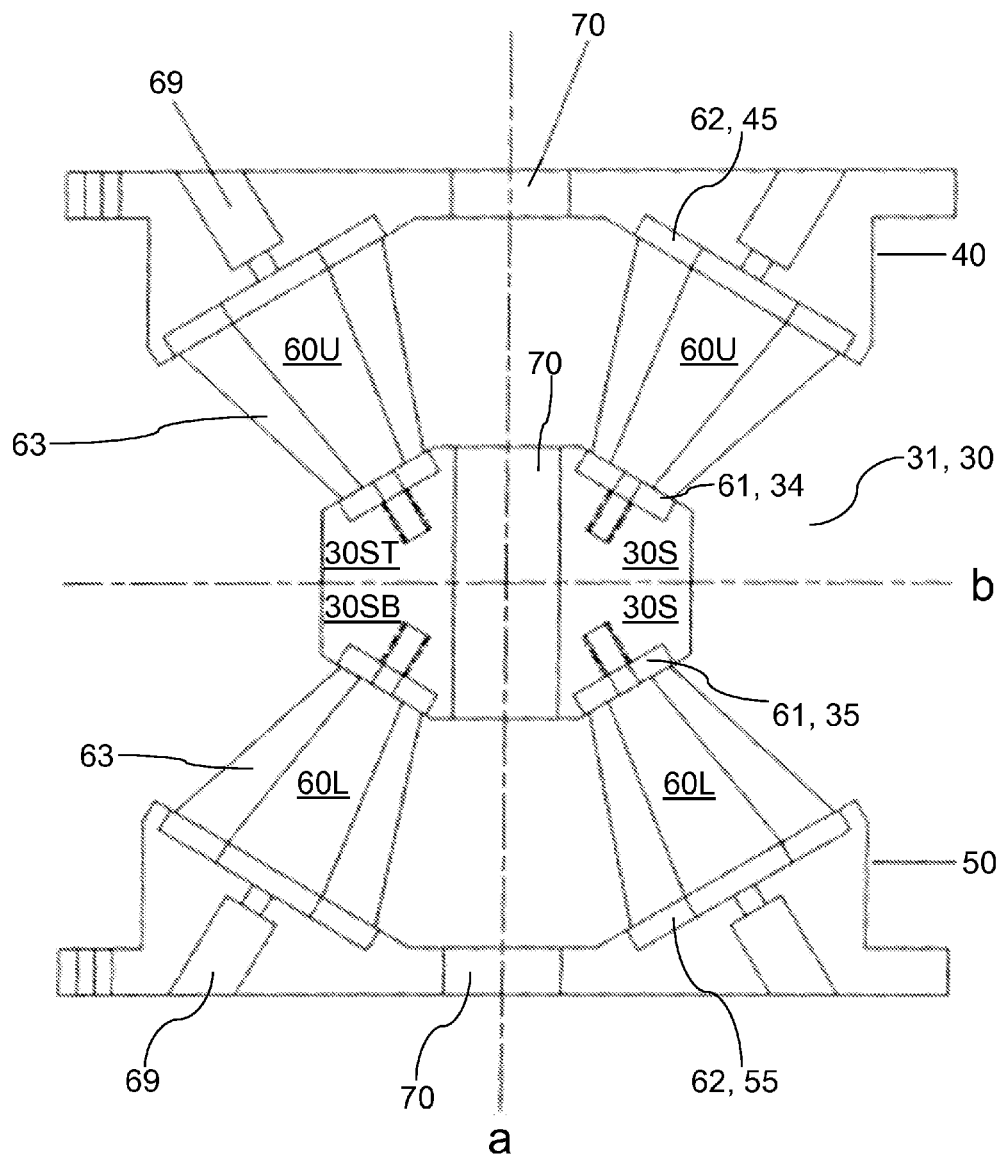
FIG. 3 is a cross-sectional elevation view, similar to the view shown in FIG. 2 but of a different inventive embodiment, viz., an embodiment of an inventive mount having a unitary axial midsection construction.
Figure 7:
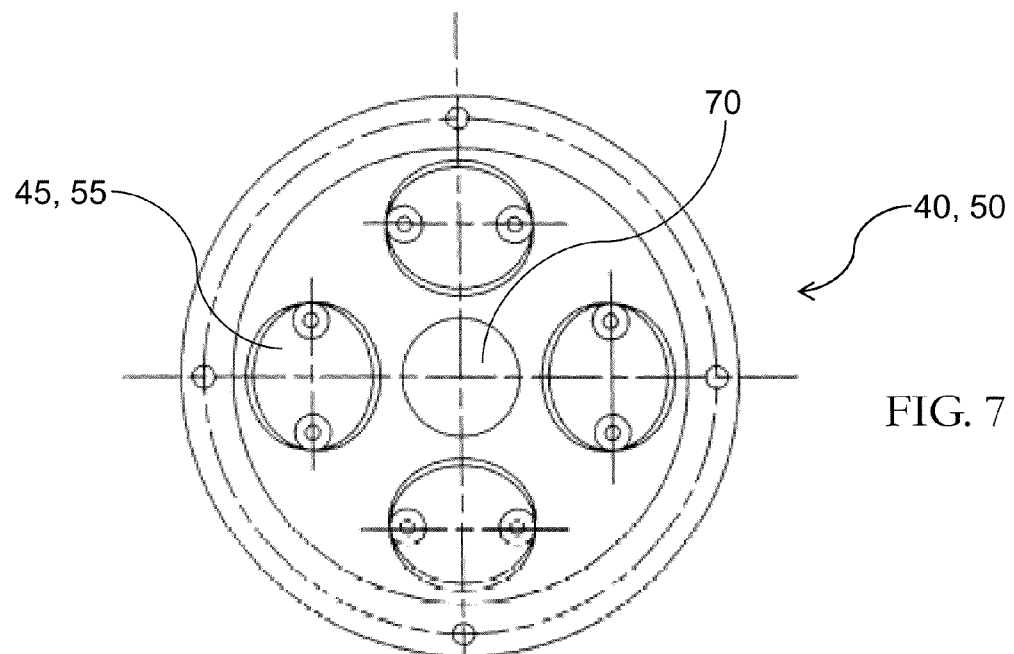
FIG. 7 is a plan view of either the upper end-section or the lower end-section of an inventive mount having either a dichotomous axial midsection construction (such as shown in FIG. 1 and FIG. 2) or a unitary axial midsection construction (such as shown in FIG. 3).
Figure 8:
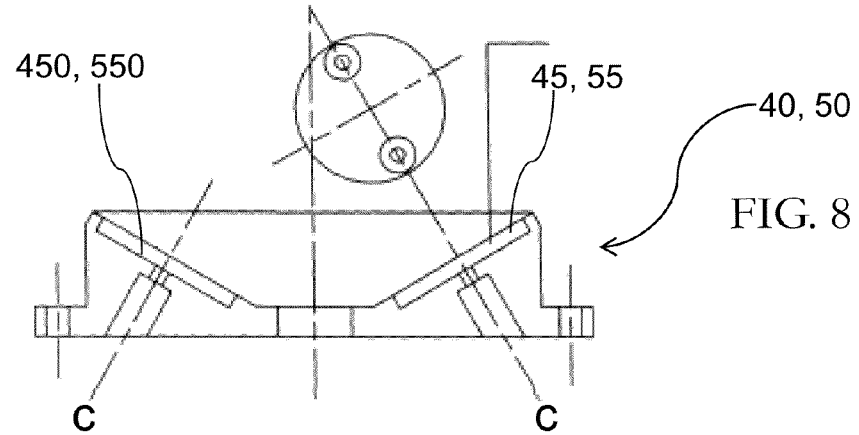
FIG. 8 is a cross-sectional elevation view of the inventive mount's upper or lower end-section shown in FIG. 7, diagrammatically illustrating engagement of a rigid-end-plated frustoconical elastomeric element's larger-diameter axial-end-plate inside a conformal recess provided in the inventive mount's axial-end-section.
Figure 9:
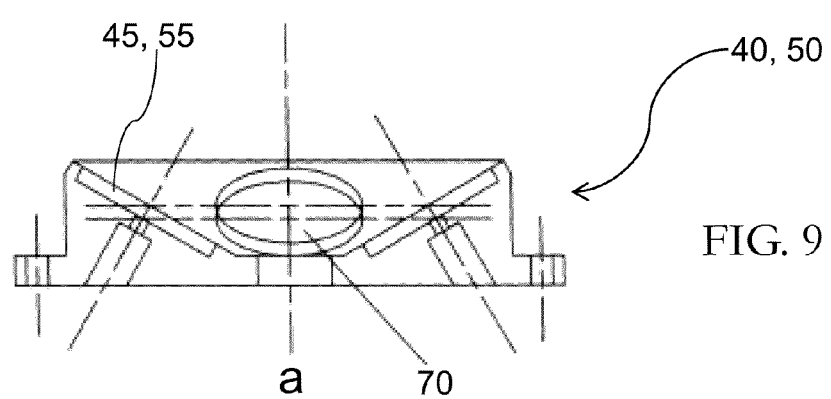
FIG. 9 is the view of FIG. 8, modified to diagrammatically illustrate the axial through-hole in the inventive mount's axial-end-section.
Figures 10, 11:
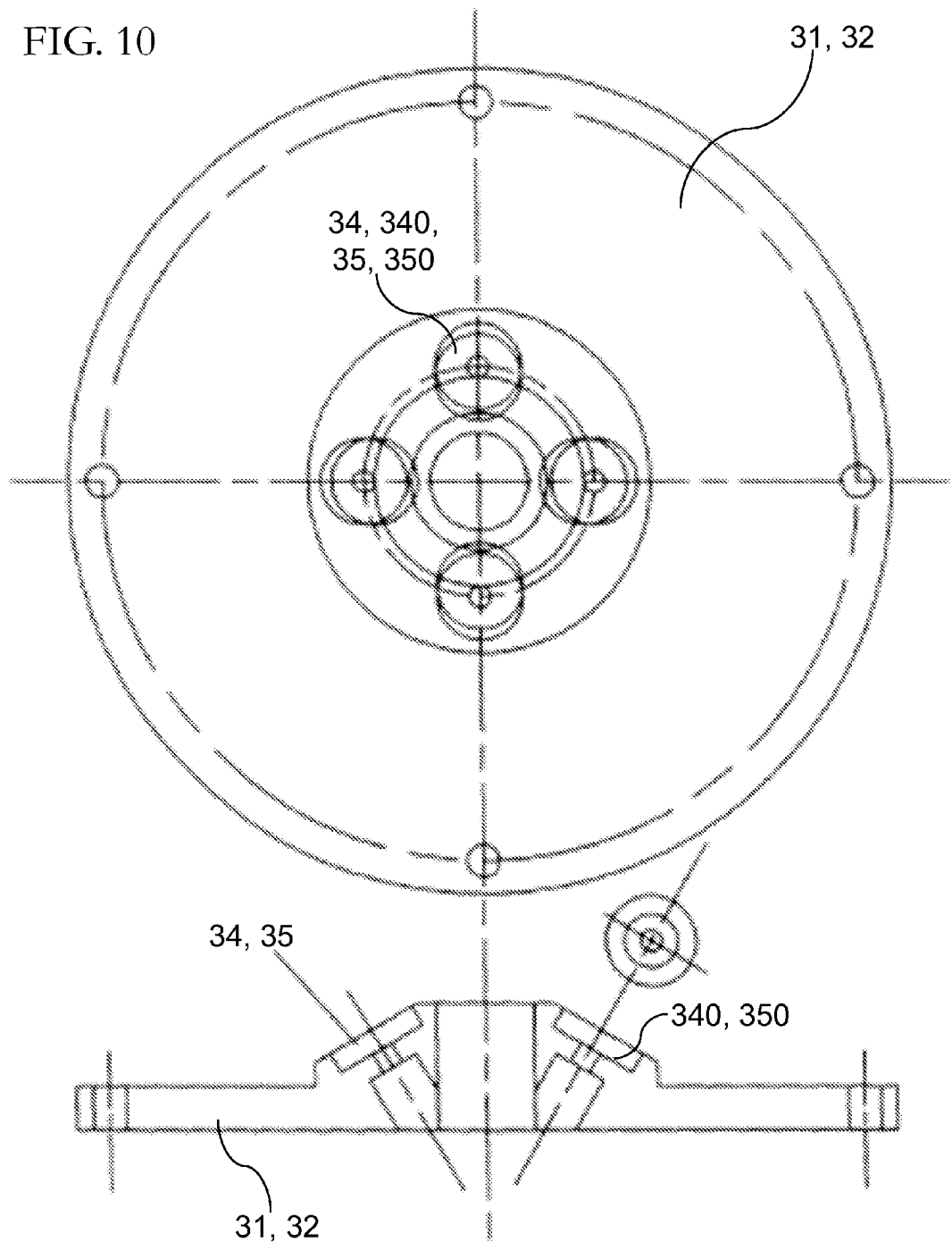
FIG. 10 is a plan view of either of the two halves of the inventive mount's dichotomous midsection shown in FIG. 1 and FIG. 2.
FIG. 11 is an elevation view of the inventive mount's dichotomous midsection half shown in FIG. 10.
Figure 12:
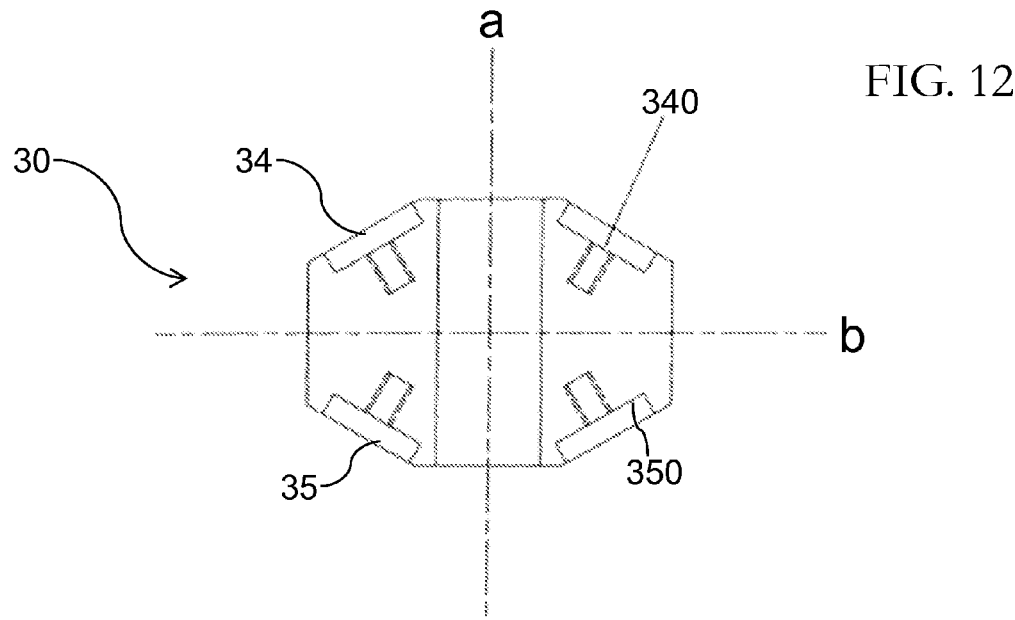
FIG. 12 is an elevation view of the inventive mount's unitary midsection shown in FIG. 3.
Figure 13:
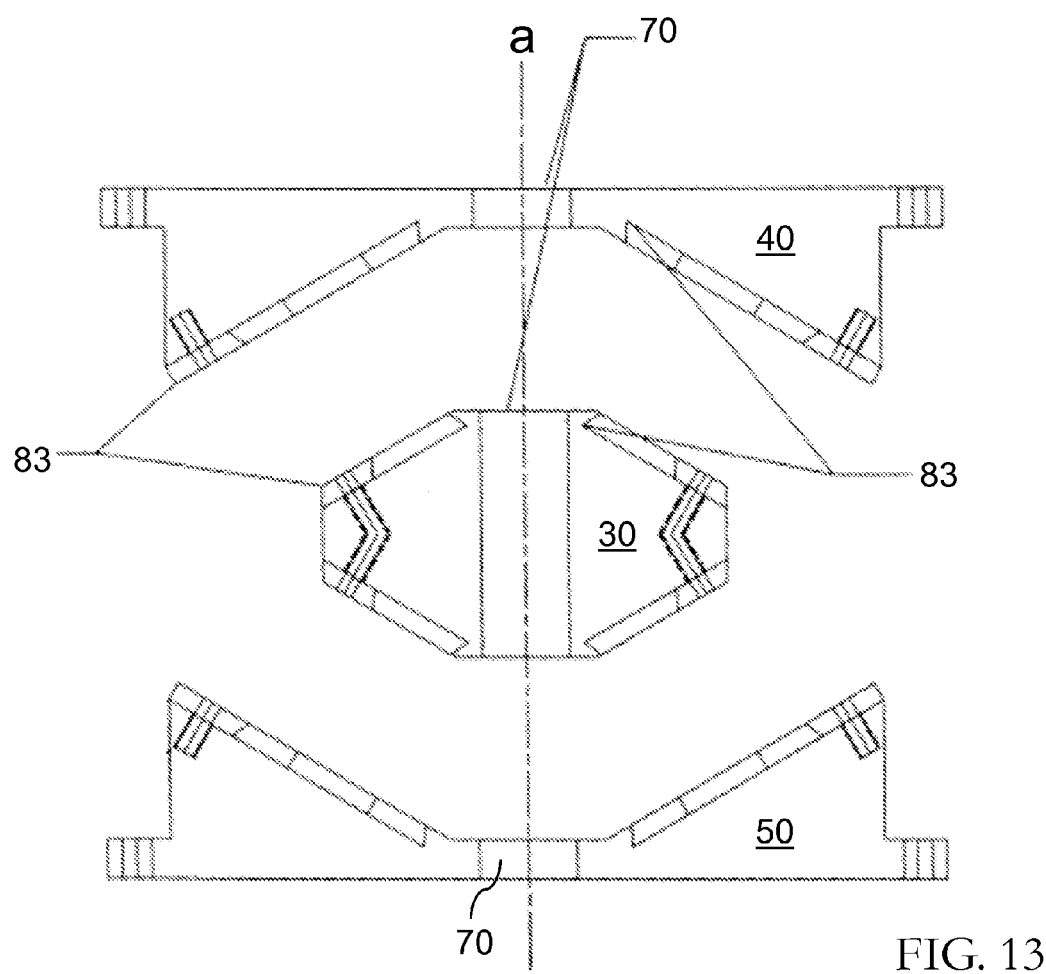
FIG. 13 is a view, similar to the view of FIG. 3 but sans the resilient elements, of an embodiment of an inventive mount that is configured to accommodate resilient elements having tapered (e.g., dovetailed) endplates.
Figure 14:
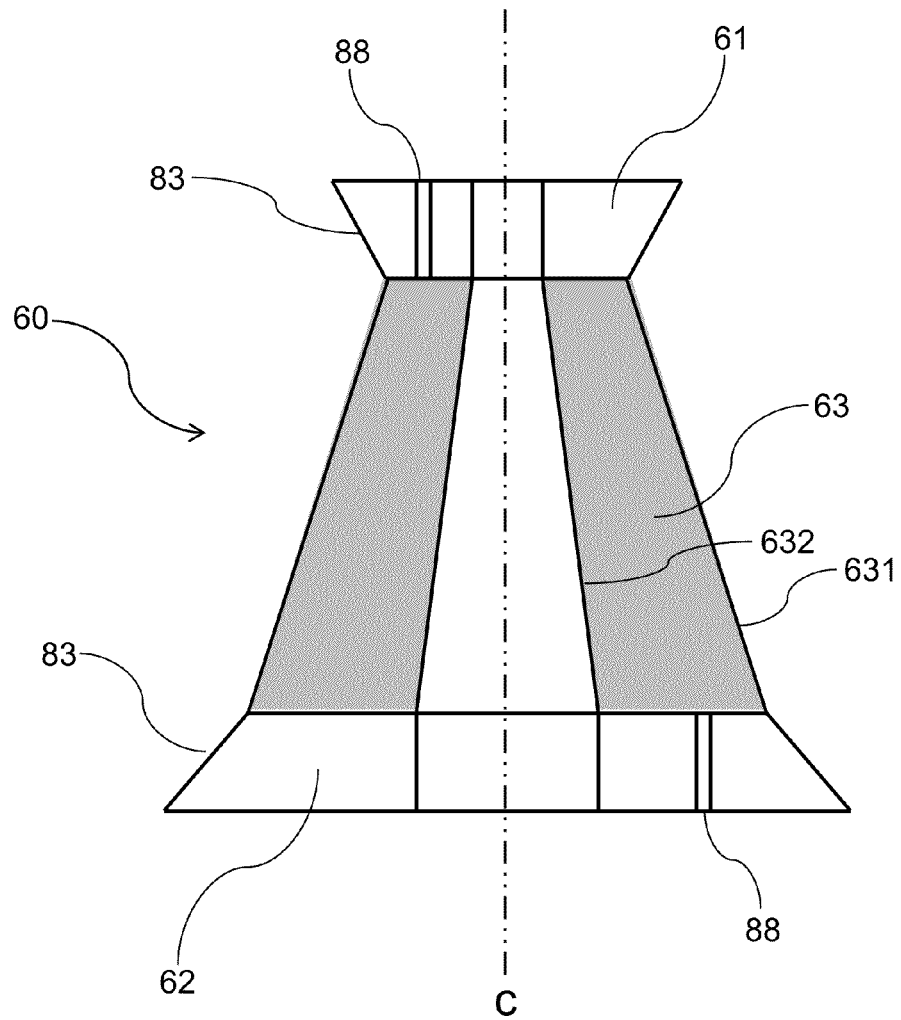
FIG. 14 is a cross-sectional elevation view of a resilient element having tapered (e.g., dovetailed) endplates, the resilient element being representative of that which may be suitable for inclusion in an inventive mount such as shown in FIG. 13.

With reference to FIGS. 1-3, many embodiments of the present invention fall into one of two modes of inventive practice, viz., (i) dichotomous midsection mode (shown by way of example in FIG. 1 and FIG. 2), and (ii) unitary midsection mode (shown by way of example in FIG. 3). The inventive mount shown in FIG. 1 and FIG. 2 has a dichotomous (including two rigid pieces, with a resilient piece therebetween) middle section 30. In contrast, the inventive mount shown in FIG. 3 has a unitary (including one rigid piece) middle section 30. However, the dichotomous midsection mount (shown in FIG. 1 and FIG. 2) and the unitary midsection mount (shown in FIG. 3) are alike insofar as having the same end sections 40 and 50.

As distinguished from dichotomous middle section 30, unitary midsection 30S as shown in FIG. 3 is an integral (e.g., single-piece) rigid (e.g., metal/metallic) structure lacking a medial damping (e.g., elastomeric) layer. Dichotomous middle section 30 and unitary midsection 30S, as they are shown herein, are similar insofar as each is symmetrical with respect to horizontal geometric bisector plane b, and is tapered toward its periphery, the tapering comporting with and facilitating angled engagement with the truncated-conical resilient elements 60. Either mode of inventive practice may be preferable, depending on the application. For instance, dichotomous midsection practice may be preferable because of the additional damping afforded by damping layer 33, or in terms of ease or cost of fabrication. Inventive practice can alternatively provide for an integral middle section that represents a kind of rigid-elastomeric-rigid sandwich composite, thus combining a singularity attribute with a rigid-plus-resilient attribute.

The inventive mount has a center through-hole 70, which is coincident with axis a, and which can be used to accommodate a snubber 71 extending therethrough. According to typical inventive practice, an a-axial snubber 71 affords auxiliary structural support in the event that the inventive mount's elastomer fails for unforeseen reasons, such as bond degradation, severe cracking or tearing, unusual operating conditions (e.g., causing excessive movements), or shock due to combat.

Through-hole 70 typically is sufficiently large in diameter to prevent sound shorting of the inventive mount, attributable to its association with a snubber 71. In order to avoid a short circuit between the isolated equipment 200 and the foundation 100, there should be a clearance or gap, in the radial direction, between snubber 71 and the defining (circumferential interior) surface of through-hole 70; in other words, snubber 71 should not touch the through-hole 70 inside surface. The term "sound shorting" is conventionally understood to refer to loss of capability of an isolation mount due to electrically conductive (e.g., metal) contact between the isolated equipment and the foundation structure 100; the contact prevents or inhibits energy attenuation from taking place inside the mount.

Snubber 71, usually made of metal, can be embodied as any of various elongate restraining mechanisms, e.g., a bar, a bolt, or a threaded-end stud. The inventive practitioner can select the size of the snubber 71 (e.g., the length and diameter of a long bolt) according to the strength requirements of the inventive mount. As shown in FIG. 1, snubber (e.g., bolt) 71 extends through the equipment 200 bedplate, the inventive mount, and the foundation 100. A washer and a nut are used to attach the inventive mount to foundation 100. There is sufficient clearance for the snubber 71 in the vertical direction, before it reaches, in a rather "stretched" condition, the washer 73 at the lower (foundation 100) end of the inventive mount. The fastener mechanism for attaching snubber 71 includes a snubber washer 73, a snubber nut 74, and a snubber lock nut 75 At the upper (equipment 200) end of the inventive mount, a hold-down strap 76 is used for holding snubber 71 in place (i.e., for preventing vertical displacement of snubber 71). Snubber 71 is not supporting, or holding together, anything in the inventive mount. Generally, an intra-envelope snubber saves space when used in association with an inventive mount. Nevertheless, inventive practice can provide for installation of one or more snubbers outside the footprint of the inventive mount, especially if space is available.

Still referring to FIG. 1 through FIG. 3, and also referring to FIG. 4 through FIG. 21, the association of the three main rigid sections 30 (or 30S), 40, and 50 with rigid-end-plated resilient (e.g., elastomeric) frustoconical elements 60 is essentially the same regardless of whether the inventive practice involves a dichotomous midsection 30 or a unitary midsection 30S. Upper end section 40 has, around its periphery, four circular major (larger-diameter) recesses 45. Lower end section 50 has, around its periphery, four circular major (larger-diameter) recesses 55. The congruity of upper end section 40 versus lower end section 50 is reflected in the entirety of their respective shapes, including the matching configurations of the major recesses 45 versus 55.

As shown in FIG. 1 and FIG. 2, middle section 30's top subsection 31 has, in one-to-one correspondence with the four major recesses 45, four circular minor (smaller-diameter) recesses 34. Middle section 30's bottom subsection 32 has, in one-to-one correspondence with the four major recesses 55, four circular minor (smaller-diameter) recesses 35. As analogously shown in FIG. 3, middle section 30S's top side 31ST has, in one-to-one correspondence with the four major recesses 45, four circular minor (smaller-diameter) recesses 34. Middle section 30S's bottom side 32SB has, in one-to-one correspondence with the four major recesses 55, four circular minor (smaller-diameter) recesses 35. The congruity of middle section 30's top subsection 31 versus middle section 30's bottom subsection 32 is reflected in the entirety of their respective shapes, including the matching configurations of the minor recesses 34 versus 35.

The axis c of each resilient element 60 is disposed, positively or negatively, at oblique angle θ with respect to axis a. Each upper major recess 45 has a flat major recess surface 45O facing generally toward, and a geometric perpendicular disposed at the same oblique angle θ, with respect to geometric axis a. Each lower major recess 55 has a flat major recess surface 55O facing generally toward, and a geometric perpendicular disposed at the same oblique angle θ, with respect to geometric axis a. Each upper minor recess 34 has a flat minor recess surface 34O facing generally away from, and a geometric perpendicular disposed at the same oblique angle θ, with respect to geometric axis a. Each lower minor recess 35 has a flat minor recess surface 35O facing generally away from, and a geometric perpendicular disposed at the same oblique angle θ, with respect to geometric axis a.

As depicted in FIG. 4 through FIG. 6, each resilient frustoconical element 60 includes a minor (smaller-diameter) endplate 61, a major (larger-diameter) endplate 62, and, therebetween, a resilient (e.g., elastomeric) frustoconical body 63. Resilient frustoconical body 63 is made of an elastomer such as rubber. Endplates 61 and 62 are made of a rigid material such as metal. The major endplates 62 of resilient elements 60 are compatible with (e.g., fit in) the major recesses 45 and 55. The minor endplates 61 of resilient elements 60 are compatible with (e.g., fit in) the minor recesses 34 and 35. Inventive practice frequently provides for an endplate having a central hole. Furthermore, the endplates can be slanted in the axial direction around its outer and/or inner circumference, such as illustrated by endplate tapers 83 shown in FIG. 13 through FIG. 15.

Each major recess 45 or 55 is conformal with and accommodates (e.g., has a slightly larger diameter than) the circular larger-diameter endplate 62 of a frustoconical elastomeric element 60. The fastener configuration at each location of attachment of an endplate 61 or 62 to housing 345 (at a recess 45, 55, 34, or 35) includes a fastener aperture 69 and a fastener such as fastener 96 shown in FIG. 1. Each minor recess 34 or 35 is conformal with and accommodates (e.g., has a slightly larger diameter than) the circular smaller-diameter endplate 62 of a frustoconical elastomeric element 60.

Figure 17:
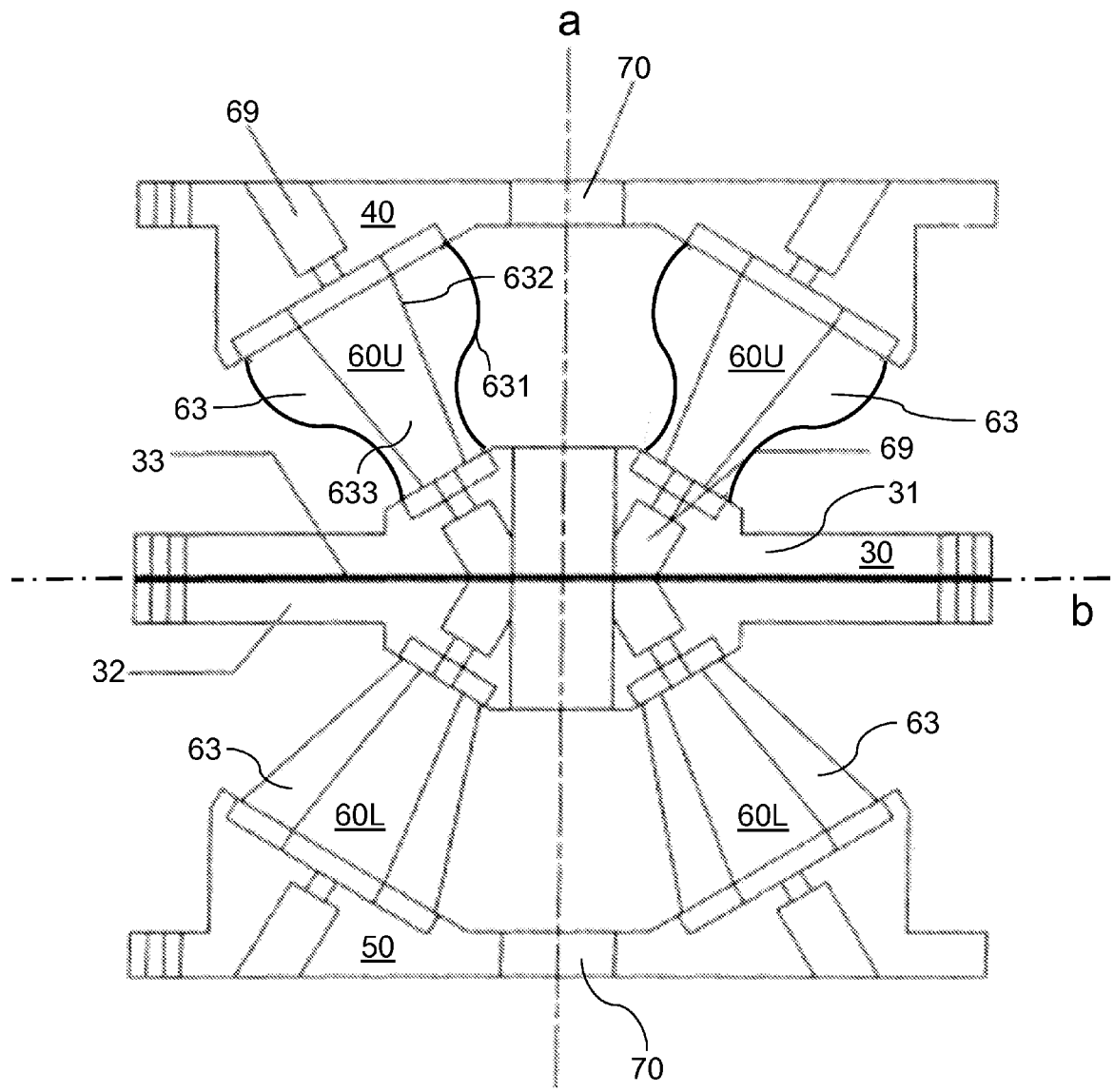
FIG. 17 is a view, similar to the view of FIG. 2, of an embodiment of an inventive mount that has differently shaped resilient elements.

Each resilient element 60 is characterized by geometric axis of symmetry c, which is disposed at oblique angle θ of with respect to the inventive mount's axis a. As illustrated in FIGS. 2, 3, and 17, axis c of each resilient element 60 is disposed at about a thirty-degree angle θ with respect to axis a; otherwise expressed, axis c of each resilient element 60 is shown to be disposed at about a sixty-degree angle with respect to medial geometric plane b. According to typical inventive practice, axis c of each resilient element 60 is disposed at an angle θ, with respect to axis a, in the range between about ten degrees and about fifty degrees; otherwise expressed, axis c of each resilient element 60 is disposed at an angle, with respect to medial geometric plane b, in the range between about forty degrees and about eighty degrees.

The geometric terms "frustoconical," "conical frustum," "frustum of a cone," and "truncated cone" are conventionally used in the field of geometry to synonymously refer to a geometric cone that is cut off (sliced off) below the apex along a plane parallel to the round base of the cone. However, these terms as used herein to describe the frustoconical shape of resilient element 60 are not strictly in accordance with the geometric definition, but rather are substantially or generally or nearly or approximately in accordance with the geometric definition.

Several figures herein illustrate, by way of example, the frustoconical shape of a resilient element 60 in accordance with the present invention. Each resilient element 60 shown in FIGS. 1-3, 5, and 15 has a resilient body 63 that is frustoconical in a strict geometric sense; however, the overall shape of resilient element 60 is not purely frustoconical because of its inclusion of endplates 61 and 62. The curvilinear upper resilient elements 60 shown in FIG. 17 represent a more extreme example of a resilient element 60 that is not frustoconical in a strict geometric sense, but that resembles or is suggestive of a geometric truncated cone—sufficiently so to permit description thereof as "frustoconical" in the context of inventive practice.

The inventive mounts depicted in FIGS. 1-3 each have resilient elements 60 that are all identical to one another. The inventive mount depicted in FIG. 14 has upper resilient elements 60 that are identical to each other, and lower resilient elements 60 that are identical to each other. However, as shown in FIG. 17, the upper resilient elements 60 differ in shape from the lower resilient elements 60. Upper resilient elements 60 have walls 630 that are curved in the c-axis direction, whereas lower resilient elements 60 have walls 630 that are straight in the c-axis direction. This nature of dissimilarity in shape between the upper and lower resilient bodies 63 can be implemented by an inventive practitioner to further dual-purpose isolation, viz., vibration isolation and shock isolation. For instance, it may be that the axially curved (upper) resilient elements 60 further shock isolation, while the axially straight (lower) resilient elements 60 further vibration isolation. Inventive practice is versatile in terms of the sizes and shapes of the resilient elements.

Although typical inventive practice provides for identity among the resilient elements 60 of each level (i.e., upper or lower), the present invention can be embodied so as to have dissimilarities in sizes and or shapes among any of the resilient elements, regardless of whether they are situated on the lower level or the upper level. For instance, inventive practice can provide for dissimilarity in sizes and/or shapes among the resilient elements 60 of each level, such as each level having a mixture of frustoconical shapes (e.g., some linear, some curvilinear) shapes and sizes.

Some inventive embodiments of element 60 include a resilient body 63 that is configured as a solid body. However, according to more typical inventive practice, element 60's resilient body 63 is configured as a hollow body, in other words formed of a resilient wall 630 that describes a frustoconical shape and that surrounds an interior space (e.g., air pocket) 633. FIG. 5 can be interpreted as representing a resilient body 63 that is either solid or hollow. Depending on how the present invention is embodied, resilient body 63 can be either solid or hollow. An inventive practitioner may choose one or the other type of resilient body 63 based at least in part on which type results in greater dissipation of energy. For instance, a wall 630 and an interior space 633 may act in concert to promote energy dissipation.

Figure 15:
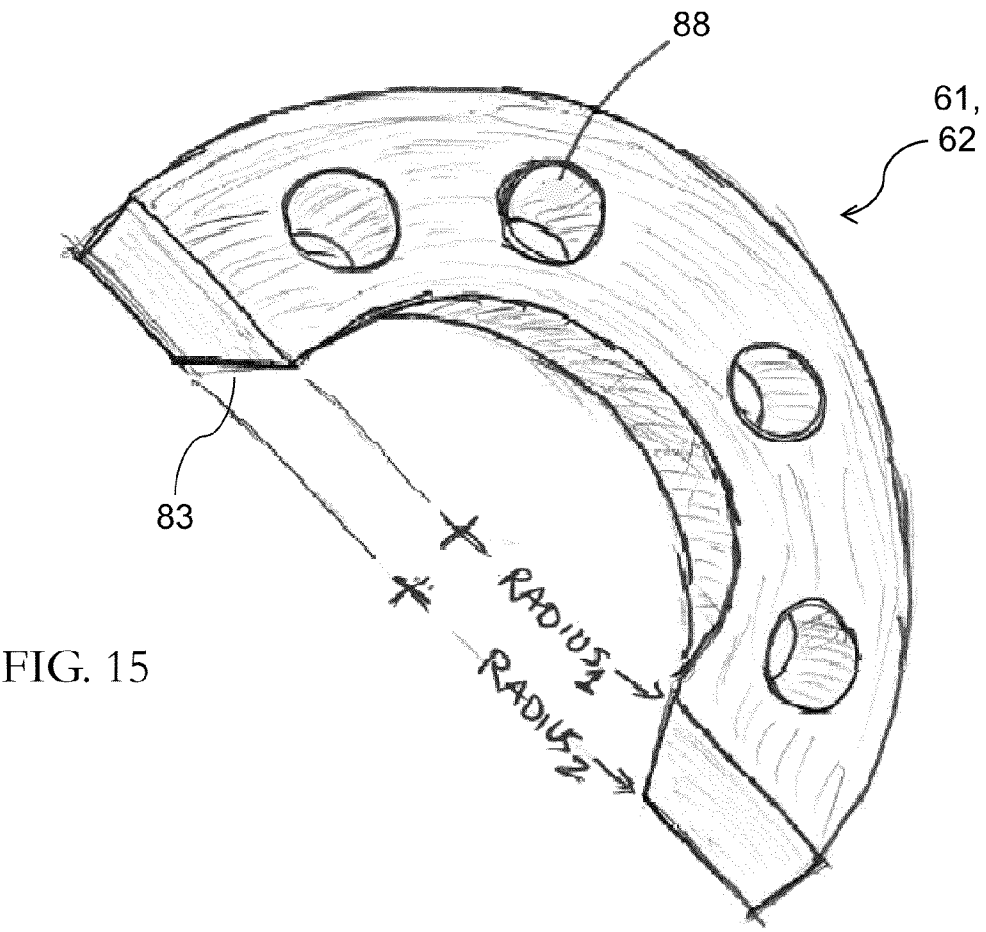
FIG. 15 is a half-section perspective view of a different embodiment of a tapered (e.g., dovetailed) endplate ring. As distinguished from the endplates shown in FIG. 14 (which are each outer-circumferentially tapered), the endplate shown in FIG. 15 is inner-circumferentially tapered.
Figure 16:
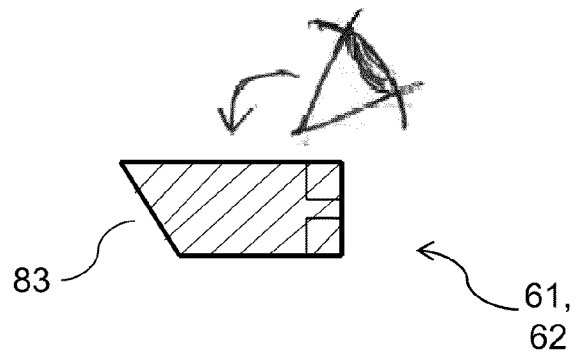
FIG. 16 is a circumferential cross-section of the endplate ring shown in FIG. 15.

Wall 630 of hollow resilient elements 63 can have either a uniform thickness or a non-uniform thickness, the latter being shown by way of example in FIG. 5 and FIG. 15. Wall 630 has an outer wall surface 631 and an inner wall surface 632. Outer wall surface 631 is disposed at about a ten-degree angle with respect to the resilient element 60's axis c; inner wall surface 632 is disposed at about a twenty-degree angle with respect to the resilient element 60's axis c. According to typical inventive practice, outer wall surface 631 is disposed at an angle, with respect to axis c, in the range between about ten degrees and about forty-five degrees; inner wall surface 632 is disposed at an angle, with respect to axis c, in the range between about five degrees and about forty degrees.

Fabrication of a resilient element 60 by means of molding can be facilitated using metal endplates 61 and 62 as adapters, as part of an injection molding process. The elastomer can be poured through one or more openings, such as metal endplate openings 88 shown in FIG. 14, so that the minor and major endplates 61 and 62, respectively, and the elastomeric body 63 therebetween, become molded as one.

Figure 20:
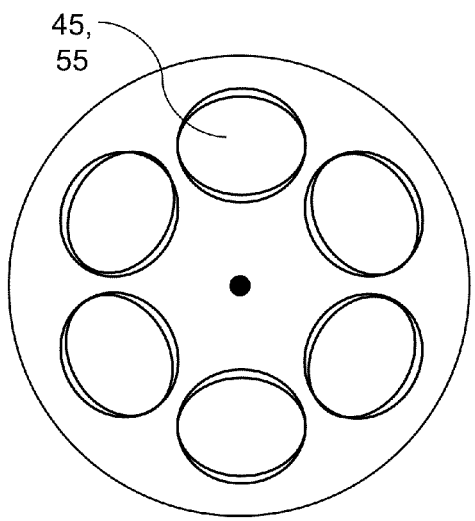

The inventive mount embodiments illustrated in FIGS. 1 through 3 and 7 through 12 each include eight resilient frustoconical elements 60, viz., four upper frustoconical elements 60 (situated between midsection 30/30S and upper end-section 40) and four lower frustoconical elements 60 (situated between midsection 30/30S and lower end-section 50). Practically any plural total number of resilient frustoconical elements 60 greater than or equal to six can be practiced in accordance with inventive principles. For instance, a twelve-element inventive mount (having six upper resilient frustoconical elements 60 and six lower resilient frustoconical elements 60) such as shown in FIG. 20 can be made to have the same footprint/envelope as an eight-element inventive mount (having four upper resilient frustoconical elements 60 and four lower resilient frustoconical elements 60).

Figure 18:
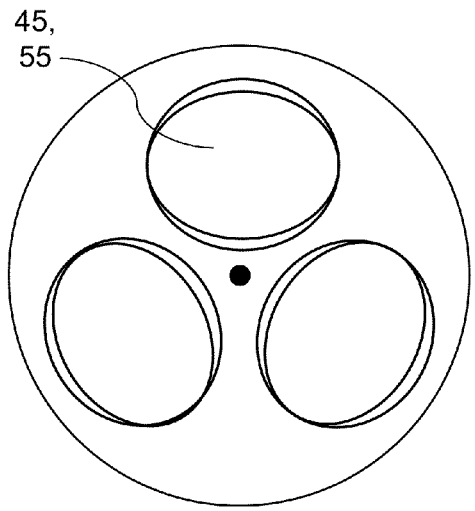
FIG. 18, FIG. 19, FIG. 20, and FIG. 21 are each a view, similar to the view of FIG. 7, of an end-section (either the upper end-section or the lower end-section) of an inventive mount. As distinguished from the end-section shown in FIG. 7 (which is configured to accommodate four resilient elements), each of the end-sections shown in FIG. 18 through FIG. 21 is configured to accommodate a number of resilient elements other than four, viz., three (FIG. 18), five (FIG. 19), six (FIG. 20), or eight (FIG. 21) resilient elements.
Figure 19:
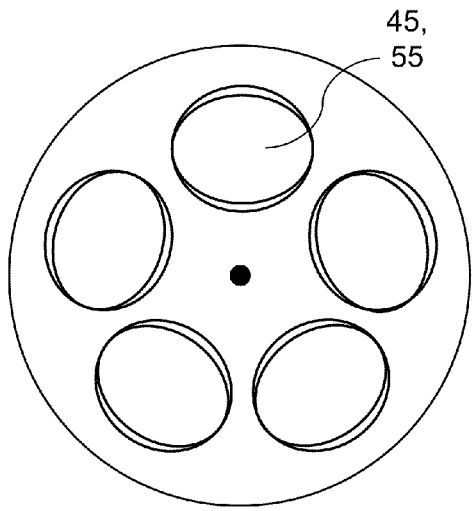
Figure 21:
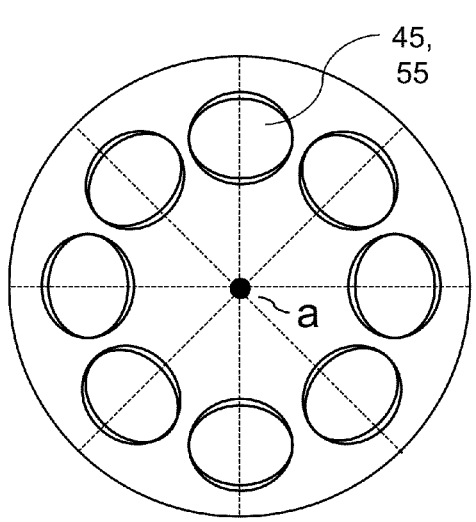

Examples of inventive mount embodiments having various other numbers of resilient frustoconical elements 60 are shown in FIG. 18, FIG. 19, and FIG. 21. FIG. 18 depicts the upper end section 40 (or lower end section 50) of a six-element inventive mount, which has three upper resilient frustoconical elements 60 and three lower resilient frustoconical elements 60). FIG. 19 depicts the upper end section 40 (or lower end section 50) of a ten-element inventive mount, which has five upper resilient frustoconical elements 60 and five lower resilient frustoconical elements 60. FIG. 21 depicts the upper end section 40 (or lower end section 50) of a sixteen-element inventive mount, which has eight upper resilient frustoconical elements 60 and eight lower resilient frustoconical elements 60.

Regardless of the number of elements 60 that are implemented by a given inventive mount, according to typical inventive practice the inventive mount is characterized by symmetry about the inventive mount's geometric axis a. As shown in FIGS. 7, 10, and 18 through 21, upper end section 40, lower end section 50, and middle section 30 are all circular and coaxial. The end sections 40 and 50 circumferentially define geometric circles of equal diameter. The middle section 30 circumferentially defines a geometric circle of smaller diameter that the circle circumferentially defined by each end section. Geometric axis a perpendicularly passes through the center of all three geometric circles.

The upper elements 60 are even with each other in approximately the same horizontal geometric plane and are symmetrically arranged about axis a. Similarly, the lower elements 60 are even with each other in approximately the same horizontal geometric plane and are symmetrically arranged about axis a. The upper major recesses 45 are even with each other in approximately the same horizontal geometric plane and are symmetrically arranged about axis a. Similarly, the lower major recesses 55 are even with each other in approximately the same horizontal geometric plane and are symmetrically arranged about axis a. The upper minor recesses 34 are even with each other in approximately the same horizontal geometric plane and are symmetrically arranged about axis a. Similarly, the lower minor recesses 35 are even with each other in approximately the same horizontal geometric plane and are symmetrically arranged about axis a.

The inventive practitioner of ordinary skill will appreciate the preferences and limitations in terms of sizes, numbers, shapes, and materials of resilient frustoconical elements 60, in consideration of such factors as the size and load capacity of the inventive mount, and the nature and loading of the entity (e.g., machinery) to which the inventive mount is to be applied. Designing or determining the configuration of each element 60 can involve selection of one, some, or all of the following physical and material parameters: cone angularity; cone height; cone thickness variability; ratio of cone base (e.g., major endplate 62) area to cone top (e.g., minor endplate 61) area; cone "shape factor"; (elastomeric) material durometer value; (elastomeric) material damping capacity; (elastomeric) material resiliency.

These and other parameters affect the ability of the inventive mount to perform efficiently as a vibration isolator, or a shock isolator, or a combined shock-and-vibration isolator. With the benefit of the instant disclosure, the ordinarily skilled entity (e.g., manufacturer or researcher) practicing the present invention can optimize one or more parameters to achieve desired operational conditions. Of particular note is the elastomeric parameter known as the "shape factor," which can be a critical controlling parameter in inventive practice. The shape factor controls the vibratory energy, or, equivalently expressed, the acoustic-reducing ability of the inventive mount. The shape factor is typically very important toward design optimization in inventive practice.

Housing 345 represents a metal structure that, by its truncated angular shape, serves to transmit and concentrate the acoustic energy in such a way that the unwanted (vibratory) acoustic energy approximately simultaneously sees resilient elements 60 in its path. The frustraconical (truncated cone) shape of each resilient element 60 promotes attenuation of the acoustic energy. In other words, the truncated metallic structure 345 steers the acoustic energy in the directions of the efficient attenuators, namely, the resilient elements 60.

According to typical inventive practice, the inventive mount operates as a vibration isolator in a passive mode. The elastomer absorbs the energy while the above-the-mount machinery 200 is running Characteristics such as the shapes, dimensions (e.g., taller versus shorter in the c-axis direction), and elastomeric material properties of the resilient elements 60 can be selected by the inventive practitioner so that the inventive mount effects a desired energy reduction for a particular application. A desirable inventive mount for many applications has a fairly low natural frequency and inherent damping characteristics.

Generally speaking, the smaller an isolation mount's natural frequency is, the better its operational acoustic capability is expected to be. For most applications, an inventive mount will operate best when its natural frequency is well below that of the forcing (induced) driven frequency for the machinery system 200 that the inventive mount isolates. The present inventor believes that a typical embodiment of the present invention's mount will have a lower natural frequency than most conventional mounts that are equivalent thereto in weight capacity.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for attenuating shock and/or vibration, the apparatus comprising an upper end structure, a lower end structure, a medial structure between said upper end structure and said lower end structure, and at least six resilient elements, each said resilient element including a hollow frustoconical elastomeric body, a larger-diameter rigid circular endplate, and a smaller-diameter rigid circular endplate, wherein:
   the apparatus is characterized by a geometric apparatus axis;
   each said hollow frustoconical elastomeric body is characterized by a geometric body axis and two body-axial ends;
   in each said hollow frustoconical elastomeric body, said larger-diameter rigid circular endplate and said smaller-diameter rigid circular endplate are respectively attached to said hollow frustoconical elastomeric body at said two body-axial ends of said hollow frustoconical elastomeric body;
   said upper end structure is characterized by at least three upper-end recesses;
   said lower end structure is characterized by at least three lower-end recesses;
   said medial structure is characterized by at least three upper-medial recesses and at least three lower-medial recesses;
   at least three said resilient elements are upper said resilient elements;
   at least three said resilient elements are lower said resilient elements;
   the upper said resilient elements are respectively secured between said upper end structure and said medial structure whereby the respective said geometric body axes of the upper said resilient elements are disposed at the same oblique angle with respect to said geometric apparatus axis;
   the lower said resilient elements are respectively secured between said lower end structure and said medial structure whereby the respective said geometric body axes of the lower said resilient elements are disposed at the same oblique angle with respect to said geometric apparatus axis;
   each of the upper said resilient elements is secured between said upper end structure and said medial structure whereby said larger-diameter rigid circular endplate fits in a said upper end recess and whereby said smaller-diameter rigid circular endplate fits in a said upper-medial recess;
   each of the lower said resilient elements is secured between said lower end structure and said medial structure whereby said larger-diameter rigid circular endplate fits in a said lower end recess and whereby said smaller-diameter rigid circular endplate fits in a said lower-medial recess.

2. The apparatus of claim 1 wherein said at least six resilient elements are arranged symmetrically with respect to said geometric apparatus axis in equal numbers of at least three upper said resilient elements and at least three lower said resilient elements.

3. The apparatus of claim 2 wherein:
   the at least three upper said resilient elements are situated in a first geometric plane that is perpendicular to said geometric apparatus axis;
   the at least three lower said resilient elements are situated in a second geometric plane that is perpendicular to said geometric apparatus axis;
   all of said at least six resilient elements are substantially the same.

4. The apparatus of claim 3 wherein the at least three upper said resilient elements are in one-to-one collocative correspondence with the at least three lower said resilient elements.

5. The apparatus of claim 2 wherein:
   the at least three upper said resilient elements are substantially the same and are situated in a first geometric plane that is perpendicular to said geometric apparatus axis;
   the at least three lower said resilient elements are substantially the same and are situated in a second geometric plane that is perpendicular to said geometric apparatus axis;
   the at least three upper said resilient elements differ from the at least three lower said resilient elements.

6. The apparatus of claim 5 wherein the at least three upper said resilient elements are in one-to-one collocative correspondence with the at least three lower said resilient elements.

7. The apparatus of claim 1 wherein said medial structure is a unitary rigid structure.

8. The apparatus of claim 1 wherein said medial structure includes two rigid members and an elastomeric layer sandwiched therebetween.

9. The apparatus of claim 1 wherein the apparatus further comprises an elongate snubber, said upper end structure being characterized by an upper end central aperture, said lower end structure being characterized by a lower end central aperture, said medial structure being characterized by a medial central aperture, said elongate snubber passing through said upper end central aperture, said lower end central aperture, and said medial central aperture without contacting said upper end structure, said lower end structure, and said medial structure, said elongate snubber being affixed to said upper end structure.

10. An isolation mount characterized by a geometric mount axis and, perpendicular thereto, a geometric medial plane, said isolation mount comprising plural resilient elements, a straight snubber member coincident with said geometric mount axis, and a housing for said resilient elements, said housing including two mount-axially extreme sections and a mount-axially medial section lying in said geometric medial plane, each of said two mount-axially extreme sections having an extreme-mount central void, said mount-axially medial section having a medial-mount central void, said extreme-mount central voids and said medial-mount central voids being aligned along said geometric mount axis, said straight snubber member extending through said medial-mount central void and said extreme-mount central voids without contacting said two mount-axially extreme sections and said mount-axially medial section, said straight snubber member being fastened to one of said two mount-axially extreme sections;

wherein each said resilient element:
is characterized by a geometric elemental axis, said geometric elemental axis intersecting said geometric mount axis and being obliquely angled with respect to both said geometric mount axis and said geometric medial plane;
includes a hollow elastomeric frustoconical body, a smaller rigid circular endplate, and a larger rigid circular endplate, said larger rigid circular endplate and said smaller rigid circular endplate being attached to said hollow elastomeric frustoconical body at opposite geometric elemental axial ends of said resilient element;
joins a mount-axially extreme section and said mount-axially medial section so that said larger rigid circular endplate mates with said mount-axially extreme section via a circular recess in said mount-axially extreme section, and so that said smaller rigid circular endplate mates with said mount-axially medial section via a circular recess in said mount-axially medial section, at least three said resilient elements joining a first said mount-axially extreme section and said mount-axially medial section, at least three said resilient elements joining a second said mount-axially extreme section and said mount-axially medial section.

11. The isolation mount of claim 10 wherein said mount-axially medial section is bisected by said geometric medial plane.

12. The isolation mount of claim 11, wherein each said resilient element is positioned so that said smaller rigid endplate is closer than said larger rigid endplate to both said geometric mount axis and said geometric medial plane.

13. The isolation mount of claim 10, wherein:
said mount-axially extreme sections are an upper mount-axially extreme section and a lower mount-axially extreme section;
said resilient elements are at least three upper resilient elements and at least three lower resilient elements;
said upper resilient elements join said upper axially extreme section and said mount-axially medial section;
said lower resilient elements join said lower axially extreme section and said mount-axially medial section.

14. The isolation mount of claim 13, wherein:
said upper resilient elements lie in an upper geometric extreme plane;
said lower resilient elements lie in a lower geometric extreme plane;
said geometric medial plane, said upper geometric extreme plane, and said lower geometric extreme plane are parallel to each other;
said geometric elemental axes corresponding to upper resilient elements are spaced apart equiangularly with respect to said geometric mount axis;
said geometric elemental axes corresponding to said lower resilient elements are spaced apart equiangularly with respect to said geometric mount axis.

15. The isolation mount of claim 14, wherein:
the number of said upper resilient elements equals the number of said lower resilient elements;
said upper resilient elements and said lower resilient elements are vertically aligned with each other.

16. The isolation mount of claim 15, wherein all of said resilient elements are approximately identical.

17. The isolation mount of claim 15, wherein:
all of said upper resilient elements are approximately identical;
all of said lower resilient elements are approximately identical;
said upper resilient elements and said lower resilient elements differ from each other.

18. The isolation mount of claim 15, wherein said mount-axially medial section is either: an entirely rigid structure; or, a partly rigid, partly elastomeric structure; said partly rigid, partly elastomeric structure having an elastomeric member intermediate two rigid members.

19. A device for attenuating shock and vibration, the device having a geometric device axis and comprising a housing and an even number of at least six resilient elements, said housing including two parallel axis-wise end structures and an axis-wise intermediate structure, each said resilient element including a hollow truncated conical resilient body a larger-diameter rigid endplate, and a smaller-diameter rigid endplate, each said hollow truncated conical resilient body having a larger-diameter body end and a smaller-diameter body end, said larger-diameter rigid endplate being coupled with said hollow truncated conical resilient body at said larger-diameter body end, said smaller-diameter rigid endplate being coupled with said hollow truncated conical resilient body at said smaller-diameter body end, said resilient elements being arranged in equal numbers in a first group and a second group, the first group being set between said intermediate structure and the first said end structure wherein each said resilient element has said larger-diameter rigid endplate fastened to the first said end structure and has said smaller-diameter rigid endplate fastened to said intermediate structure, the second group being set between said intermediate structure and the second said end structure wherein each said resilient element has said larger-diameter rigid endplate fastened to the second said end structure and has said smaller-diameter rigid endplate fastened to said intermediate structure, each said resilient element being obliquely disposed at the same angle relative to said device axis so that its smaller diametric element end is nearer than its larger diametric element end to said device axis and to said intermediate structure.

20. The device of claim 19 wherein the apparatus further comprises a linear snubber, the first said end structure being characterized by a first center through-hole, the second said end structure being characterized by a second center through-hole, said medial structure being characterized by a medial center through-hole, said linear snubber non-contiguously passing through said first center through-hole, said second center through-hole, and said medial center through-hole.

* * * * *